Dec. 28, 1937.  A. SMART  2,103,700
FUEL MIXTURE SUPPLY CONTROL FOR THE INTERNAL
COMBUSTION ENGINES OF MOTOR VEHICLES
Filed Dec. 13, 1935  3 Sheets-Sheet 1

Algernon Smart,
INVENTOR

BY Toulmin & Toulmin,
ATTORNEYS

Dec. 28, 1937.  A. SMART  2,103,700
FUEL MIXTURE SUPPLY CONTROL FOR THE INTERNAL
COMBUSTION ENGINES OF MOTOR VEHICLES
Filed Dec. 13, 1935  3 Sheets-Sheet 2

Algernon Smart,
INVENTOR

BY Toulmin & Toulmin
ATTORNEYS

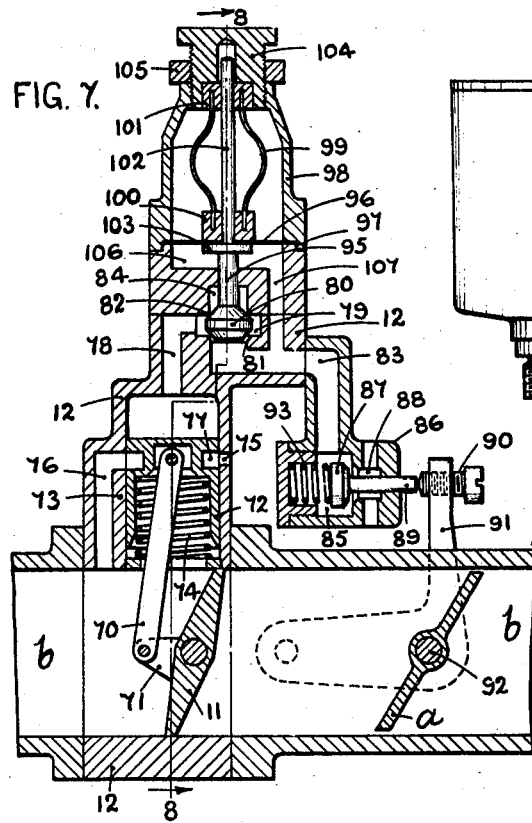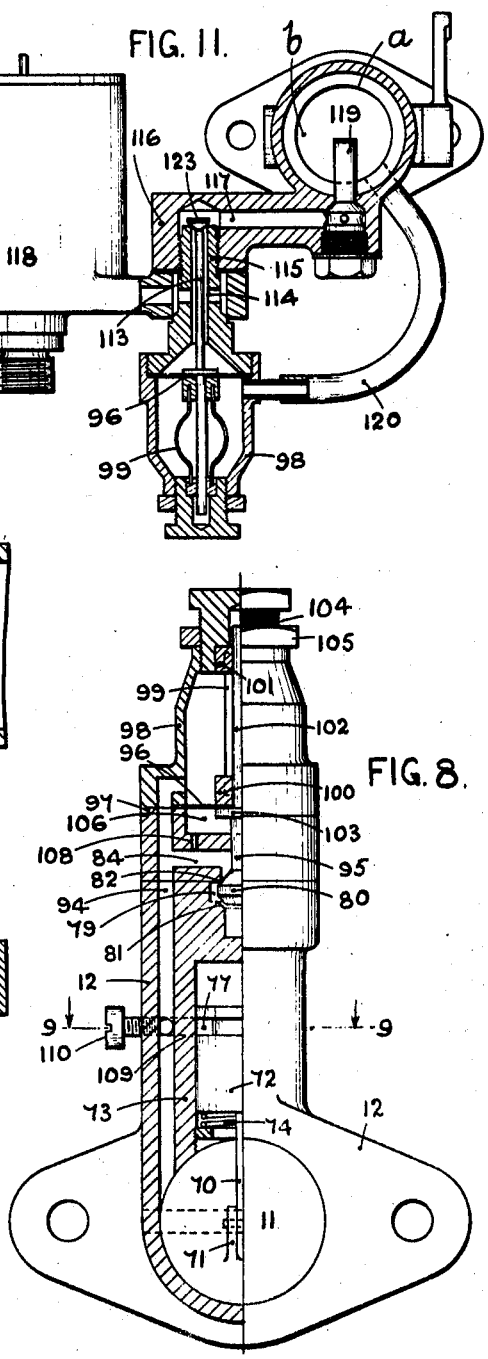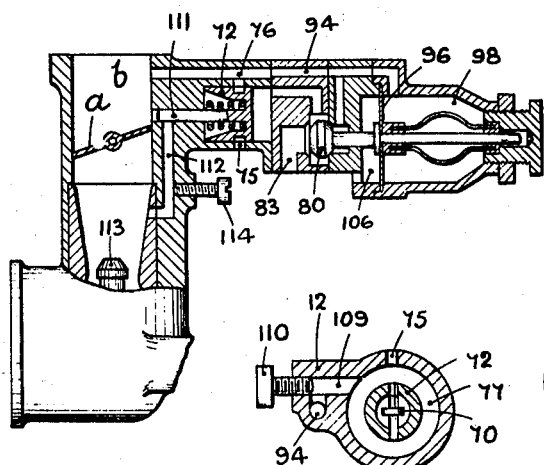

Patented Dec. 28, 1937

2,103,700

UNITED STATES PATENT OFFICE 2,103,700

FUEL MIXTURE SUPPLY CONTROL FOR THE INTERNAL-COMBUSTION ENGINES OF MOTOR VEHICLES

Algernon Smart, Newcastle-upon-Tyne, England

Application December 13, 1935, Serial No. 54,239
In Great Britain December 15, 1934

8 Claims. (Cl. 192—.01)

This invention relates to means for controlling the supply of fuel-mixture to the internal-combustion engines of motor vehicles.

It is customary to control the supply of fuel-mixture to the engine of a motor vehicle by means of a throttle valve operated by an accelerator pedal, the closing of said valve, when pressure is removed from said pedal, being limited so that a predetermined minimum supply of mixture passes to the engine even when the latter is merely idling. This position of the throttle valve is hereinafter termed idling position.

In general, the object of the present invention is to provide novel and useful fuel-mixture control means whereby to eliminate the waste of fuel which has hitherto occurred when the throttle valve is in idling position and the engine is not being used for propulsion but remains coupled to the power-transmission system of the vehicle while the latter is travelling at speed under its own momentum, say down an incline, said control means also serving to shut-off the excessive stream of fuel, which temporarily occurs when the throttle valve is suddenly allowed to close to idling position, and thereby preventing the flushing-out of the engine cylinders by rich fuel-mixture and the consequent waste of lubricating oil.

With this and other objects in view, as will appear as the description proceeds, my invention consists in the novel methods of operation, features of construction and combinations and arrangements of parts hereinafter described and particularly defined in the claims appended to this specification.

The accompanying drawings illustrate examples of fuel-mixture supply controls in accordance with my invention. In the drawings, Figures 1, 2 and 3 are diagrammatic elevations respectively illustrating different operative positions of one form of mechanically-operated control means;

Figures 7, 8 and 9 illustrate an example of suction-actuated control means, Fig. 7 being a sectional elevation, Fig. 8 an elevation at right-angles thereto and half in section on the line 8—8 in Fig. 7, and Fig. 9 a section on the line 9—9 in Fig. 8;

Figure 10 is a similar view to Fig. 7 illustrating an alternative form of suction-operated control means; and Figure 11 is a transverse section illustrating a further alternative form of suction-actuated control means.

Figure 1:
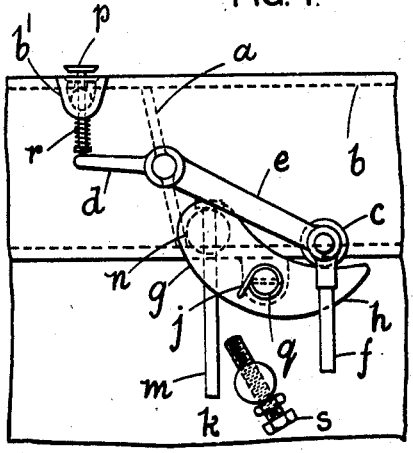
Figure 2:
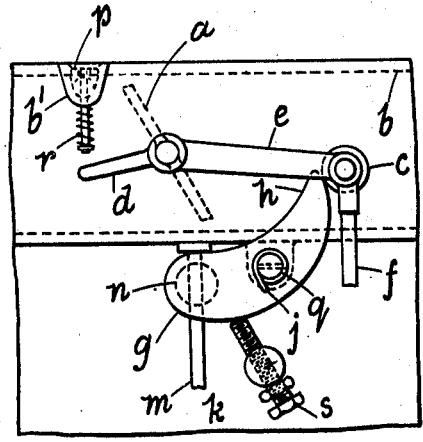
Figure 3:
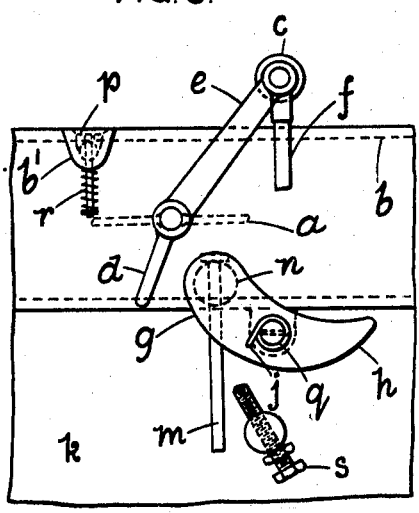

Referring first to Figs. 1, 2 and 3 of the said drawings, in the mechanical device therein illustrated, $a$ is the throttle valve disposed in the pipe $b$ which is the pipe leading from the carburetter to the engine. On the spindle of the valve $a$ is fixed a lever $d$, $e$ to the end of the arm $e$ of which is pivotally attached a rod $f$ which is connected to the accelerator pedal. $g$, $h$ is the movable stop and is pivoted at $q$ on a lug on the pipe $b$, said stop being provided with a spring $j$ which is coiled around and anchored to its pivot. $m$ is a headed rod connected to the clutch mechanism of the engine. The rod $m$ slides through a pin $n$ rotatable in the arm $h$ of the stop. $c$ is a roller at the end of the arm $e$, and $p$ is an air inlet valve mounted in a pocket $b^1$ open to the pipe $b$, said valve being normally held closed by the spring $r$. $s$ is an adjustable set screw limiting the movement of the stop $g$, $h$ in one direction, said set screw being supported by the cylinder block $k$ or other adjacent fixed part of the engine.

Fig. 3 shows the position of the members for normal running under the control of the accelerator pedal, the throttle valve $a$ being shown as fully open, the air valve $p$ closed, and the arm $g$ of the stop held by its spring $j$ against the head of the clutch rod $m$. When, however, engine propulsion is not required (for example, where a vehicle is running down a hill), the pressure on the accelerator pedal is withdrawn and the members take up the position shown in Fig. 1, the throttle valve $a$ being fully closed and the supply of fuel-mixture to the engine wholly shut-off. At the same time the air valve $p$ is held open by the arm $d$ of the lever on the throttle valve spindle to allow the engine to draw in air. So long as the engine is connected to the transmission system, the engine is driven by the vehicle, and fuel mixture can be again supplied to the engine when desired by pressing down the accelerator pedal to return the members to the positions shown in Fig. 3 with the throttle valve $a$ open and the air valve $p$ closed.

If now the clutch mechanism is operated to disconnect the engine from the transmission system of the vehicle while the accelerator pedal is not depressed, the operation of the clutch mechanism causes the rod m to pull down the arm g of the pivoted stop against the action of its spring j and cause its arm h to raise the arm e of the lever on the throttle valve spindle to move the throttle valve into its idling position as shown in Fig. 2, in which position it is retained by the engagement of the nose of the arm h with the roller c on the arm e, the set screw s limiting the downward movement of the stop g, h. Sufficient fuel-mixture is now allowed to pass into the pipe b to ensure that the engine idles and stalling thereof is avoided. Subsequent pressure on the accelerator pedal raises the arm e and releases the stop g, h which returns to the normal position shown in Figs. 1 and 3 under the action of its spring. The set-screw s can be adjusted as required to increase or decrease the opening of the valve a in its idling position.

It will be seen that, with the device illustrated in Figs. 1 to 3, the throttle valve a can be fully closed and the air valve p opened only while the engine is connected to the power-transmission system. Immediately the engine is disconnected, the rod m comes into action and re-opens the throttle valve to an amount which ensures the supply of sufficient fuel-mixture to keep the engine running slowly.

Figure 4:
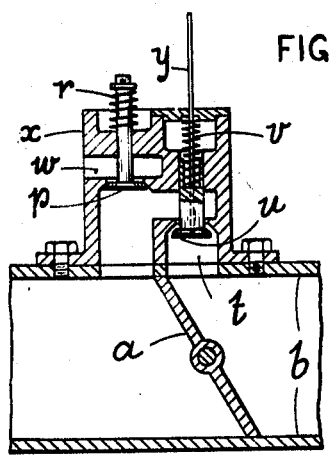
Figure 4 is a vertical section illustrating an alternative form of mechanically-operated control means.

Alternatively, and as illustrated in Fig. 4, I may provide a by-pass t around the throttle valve a in the pipe b, and provide said by-pass with an air valve p held closed by an adjustable spring r and with a valve u pressed open by an adjustable spring v. The valve p controls an air inlet w in the by-pass fitting x, and the valve u is connected by a cable y to the moving member of a centrifugal governor driven by the engine of the vehicle. The governor is not illustrated and may be of any well-known type of speed governor. It is adjusted so that it automatically applies a pull t′ the cable y which overcomes the resistance of the spring v and closes the valve u when the speed of the engine exceeds its idling speed. It will therefore be seen that the by-pass t is open only when the engine is revolving at idling speed or less. When the throttle valve a is fully closed and the speed of the engine is greater than idling speed, the valve u shuts the by-pass t and the passage of fuel-mixture to the engine is stopped. At the same time the engine suction on the engine side of the throttle valve is sufficient to cause the air valve p to open against the resistance of its spring r to admit air to the by-pass on the engine side of the throttle valve (i. e. the left-hand side of Fig. 4). The air valve p remains open only while the engine suction is sufficient to overcome the spring r and this occurs only when the throttle valve a and the by-pass valve u are both closed. When the speed of the engine falls to idling speed, the valve u is re-opened by its spring and a supply of fuel-mixture passes through the by-pass t to the engine which is sufficient to prevent stalling.

Figure 5:
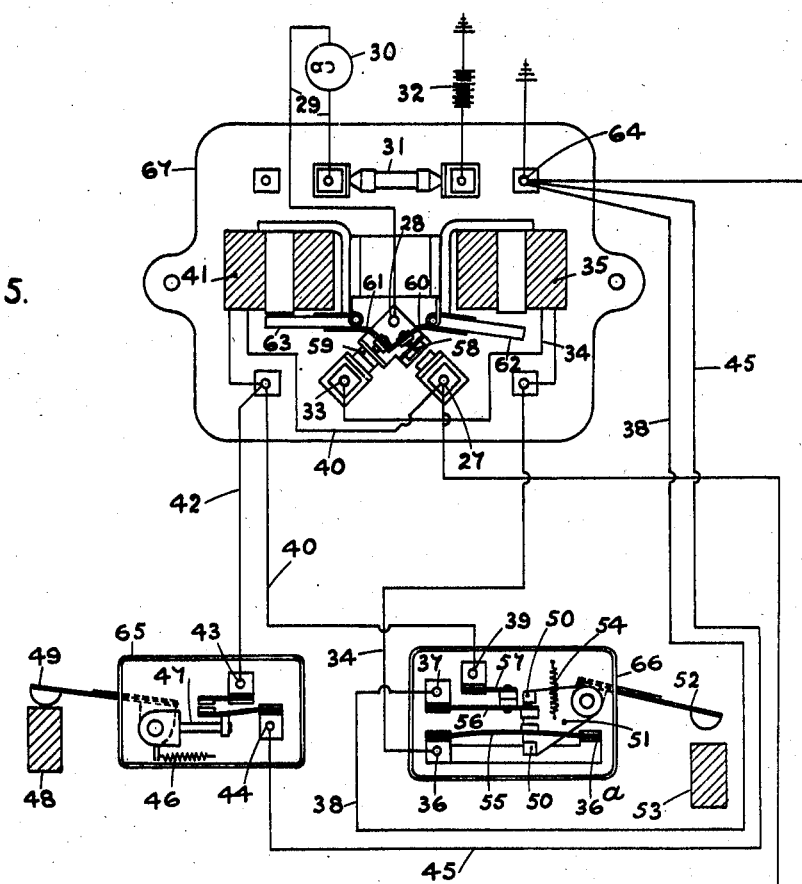
Figures 5 and 6 illustrate an example of electro-magnetically-operated control means, Fig. 5 being a diagrammatic view showing the connections, and Fig. 6 a section on the line 6—6 in Fig. 5.
Figure 6:
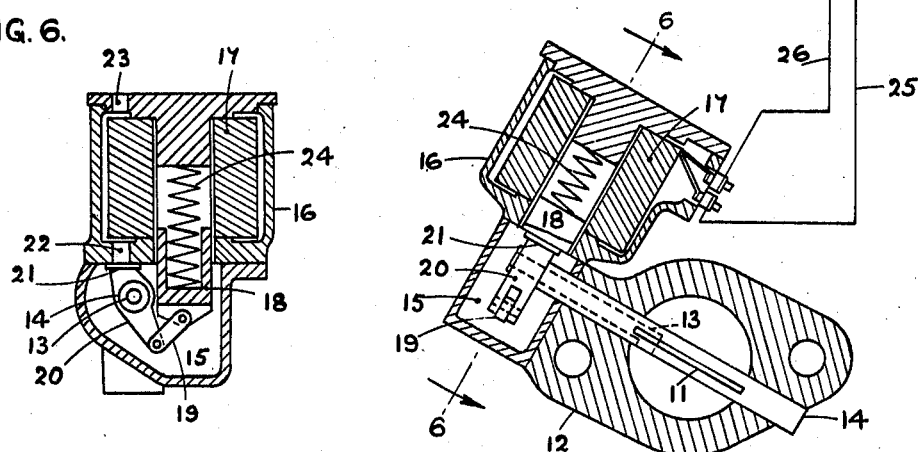

Referring now to Figs. 5 and 6, in the electro-magnetic device therein illustrated, I interpose a supplementary throttle valve 11 between the carburettor and the induction manifold, said valve being mounted in a housing 12 capable of being inserted in the pipe connecting said parts, and I provide an air passage 13 in the spindle 14 of said valve, said passage opening on the engine side thereof and leading from a chamber 15 in a casing 16 attached to the housing 12 and containing an electro-magnet 17. The core 18 of said magnet is connected by a link 19 to one arm of a lever 20 on the spindle 14, the other arm of said lever being provided with a face 21 forming a valve coacting with an air port 22 leading from the space around the magnet 17 which is open to atmosphere through an air inlet 23 as shown in Fig. 6. 24 is a spring within the magnet which projects its core 18 when the magnet is not energized. When the core is projected, the supplementary valve 11 is fully open and the air port 22 is closed by the valve 21 as shown.

One end of the coil of the magnet 17 is connected to an earthed terminal 64 by a wire 25, and the other end of said coil is connected by a wire 26 to one terminal 27 of an interlocking switch the feed terminal 28 of which is connected by a wire 29 through a master switch 30 on the dashboard of the vehicle and a fuse 31 to the usual battery 32 on the vehicle. The other terminal 33 of the interlocking switch is connected by wires 34 and through the coil of a solenoid 35 to one terminal 36 of a two-way switch, the common terminal 37 of which is connected to the earthed terminal 64 by a wire 38, its other terminal 39 being connected by wires 40 and through the coil of a second solenoid 41 to the terminal 27 of the interlocking switch which is connected to the magnet 17. The coil of the solenoid 41 is also connected by a wire 42 to the terminal 43 of a one-way switch, the other terminal 44 of which is connected to the earthed terminal 64 by a wire 45.

The one-way switch 43, 44 is normally kept closed by a spring 46 acting through a pivoted rocker 47, but is opened when the clutch lever (indicated at 48) or equivalent mechanism engages and lifts a finger 49 on said rocker which occurs when the clutch is engaged. The two-way switch 36, 37, 39 is actuated by projections 50 on a pivoted rocker 51 provided with a finger 52 in the way of the accelerator pedal lever which is indicated at 53, a spring 54 holding said finger clear of said lever when the pedal is depressed. The projections 50 co-act with spring contacts 55, 56, 57 projecting from the terminals 36, 37, 39 respectively. The spring contact 55 is bowed between the terminal 36 and an extension 36a thereof so that it remains in either the raised position shown or in a depressed position until forcibly changed over by the projections 50 of the rocker 51. It will be seen that the contacts 56, 57 are in engagement when the finger 52 is in its normal position as shown, i. e. the terminal 39 is earthed when the accelerator pedal is depressed.

The feed terminal 26 of the interlocking switch is provided with spring contacts 58, 59 with which co-act fingers 60 and 61 forming extensions of the armature 62, 63 of the solenoids 35, 41 respectively, the free ends of said fingers interlocking as shown to maintain in its raised position the armature of the solenoid last excited.

The panels 65, 66 carrying the one-way switch 43, 44 and the two-way switch 36, 37, 39 respectively are mounted on parts of the vehicle conveniently adjacent to the clutch lever 48 and accelerator pedal lever 53 respectively, and the panel 67 carrying the solenoids 35, 41 and the interlocking switch 27, 28, 33 may be mounted on the dashboard or in other convenient position.

Fig. 5 shows the position of the switches when the engine is connected to the transmission system of the vehicle and the accelerator pedal is depressed for normal running, and in this position the circuit of the magnet 17 is broken by reason of the gap between the contact 58 and the terminal 27. During normal running therefore the supplementary throttle valve 11 is held open by the spring 24 within the magnet and the air valve 21 closes the air inlet 22, the supply of fuel-mixture to the engine being regulated by the throttle valve under the control of the accelerator pedal as customary.

It will be seen that, the master switch 30 being closed, the circuit of the magnet 17 is completed only when the contact 58 is engaged with the terminal 27, and to cause such engagement it is necessary to energize the solenoid 35. This occurs when engine propulsion is not required and pressure on the accelerator pedal is withdrawn, the lever 53 then pushing up the finger 52 whereupon the rocker 51 depresses the contact 56 into engagement with the contact 55 to close the circuit of the solenoid 35 through the terminals 33, the contact 59 and the terminals 28. The solenoid 35 at once attracts its armature 62 and causes its finger 60 to engage the contact 58 with the terminal 27 to close the circuit of the magnet 17 and at the same time to release the finger 61. The consequent fall of the armature 63 disengages the contact 59 from the terminal 33 and the circuit of the solenoid 35 is broken but its armature 62 is held in its raised position by the tip of the finger 61 engaging behind the finger 60, and the engagement of the contact 58 with the terminal 27 and the feed to the magnet 17 are maintained. Thus, so long as there is no pressure on the accelerator pedal, the magnet 17 closes the supplementary throttle valve 11 to shut-off the supply of fuel-mixture to the engine and opens the air inlet 22 to allow air to enter the induction manifold which condition persists while the engine remains connected to the transmission system. Subsequent depression of the accelerator pedal however frees the finger 52 and allows the contact 56 to disengage the contact 55 and engage the contact 57 whereupon the circuit of the solenoid 41 is completed through the terminal 27 and its armature 63 is attracted. The movement of the armature 63 releases the armature 62 and disconnects the contact 58 from the terminal 27 thus breaking the circuit of the magnet 17 and allowing the spring 24 in the magnet to re-open the supplementary valve 11 and close the air port 22, the parts being then in the position illustrated in Fig. 7.

If, while the magnet 17 is energized and the supplementary valve 11 closed and the air inlet open, the engine is disconnected from the power-transmission system by operating the clutch lever 48, the fall of this lever frees the finger 49 and allows the spring 46 through the rocker 47 to close the circuit of the solenoid 41 through the terminals 43, 44, the same action occurs as when said circuit is closed through the contacts 56, 57 on depression of the accelerator pedal as above described, and it will now be seen that the operation of de-clutching the engine and of accelerating respectively break the circuit of the magnet 17 and result in the supplementary valve 11 being opened and the air inlet 22 closed thus either restoring the minimum mixture supply to the engine through the throttle valve proper in its idling position, or the control of said supply by the accelerator pedal.

A supplementary throttle valve 11 is also employed in the suction-actuated arrangement illustrated in Figs. 7, 8, and 9, said valve being mounted in a housing 12 introduced into the induction pipe b on the engine side of the usual throttle valve a and being opened and closed by a connecting rod 70 pivotally attached to a lug 71 on the valve and to a piston 72 in a cylinder 73 formed in said housing. The lower end of the cylinder is open to the induction pipe on the engine side of the valve 11, and a spring 74 is provided within the piston 72 which tends to keep it raised and consequently to hold open the valve 11. 75, 76 are air ports in the walls of the cylinder, and 77 is a groove around the piston 72 which registers with said ports when the piston is in its bottom position and the valve 11 is closed as shown. When the valve 11 is open, the ports 75, 76 are covered by the piston.

A passage 78 connects the space above the piston 72 to a chamber 79 in which is a valve 80 disposed between seatings 81, 82 so as to alternatively close passages 83, 84 leading to the chamber 79. The passage 83 leads from below the valve 80 to a chamber 85 in an extension 86 of the housing 12, said chamber containing a valve 87 controlling an air inlet 88. The valve 87 has a projecting spindle 89, and an adjustable stop 90 on an arm 91 on the spindle 92 of the throttle valve a co-acts with the end of said spindle to force it and the valve 87 inwards against a spring 93 in the chamber 85 to admit air to said chamber. The passage 84 leads from above the valve 80 to a passage 94 in the back of the housing 12 communicating with the induction pipe on the engine side of the valve 11. The spindle 95 of the valve 80 is fitted with a diaphragm 96 the periphery of which is held between a seating 97 around the upper end of the housing 12 and a cover 98 screwed thereonto, said cover enclosing a spring 99 which extends between collars 100, 101 on an extension 102 of the spindle 95. The collar 100 bears on the upper face of the diaphragm 96 and presses said diaphragm onto a collar 103 around the spindle 95, and the collar 101 is received in a cap 104 screwed into the cover 98. The cap is adjustable in said cover to vary the compression of the spring 99 and, after adjustment, is locked in position by the nut 105.

The chamber 106 below the diaphragm 96 is connected by a passage 107 to the air passage 83, and a small aperture 108 (Fig. 8) connects said chamber to the passage 84. A port 109 is provided in the back of the cylinder 73 which leads to the passage 94, said port being positioned so that the air groove 77 around the piston 72 registers with said port when the piston is in its bottom position, i. e. when the supplementary throttle valve 11 is closed and said groove registers with the air ports 75, 76. An adjustable screw 110 is provided in the wall of the housing 12 to control the exit of the port 109 and hence the admission of air into the passage 94.

During normal running when the supply of fuel-mixture to the engine is controlled as customarily by the accelerator pedal through the throttle valve a, the piston 72 is raised by its spring 74 and the supplementary throttle valve 11 is held open while the air ports 75, 76 are closed by said piston.

When pressure is withdrawn from the accelerator pedal and the throttle valve assumes its idling position, the arm 91 swings to the left and its stop 90 strikes the spindle 89 and presses the valve 87 inwards to admit air to the passages 83, 107 and the chamber 106 below the diaphragm 96. The interior of the cover 98 is open through the passage 94 to the suction on the engine side of the supplementary valve 11 which suction tends to cause the diaphragm to raise the valve 80, but said tendency is resisted by the spring 99. The spring 99 is adjusted so that the suction caused by the engine when it is merely idling is insufficient to overcome the resistance of said spring, but the increased engine suction, which occurs when the throttle valve is in idling position and the engine is driven by the vehicle at a greater speed than the normal idling speed, acts upon the upper side of the diaphragm and permits the atmospheric pressure in the chamber 106 to raise the valve 80 whereupon air passes through the chamber 79 and passage 78 to the cylinder 73. The consequent atmospheric pressure above the piston 72 overcomes the resistance of the spring 74 and forces down said piston thus closing the supplementary valve 11 to shut-off the supply of fuel-mixture to the engine and at the same time admitting air to the engine side of said supplementary valve through the ports 75, 76. This is the condition shown in Figs. 7 and 8 and persists so long as the engine remains connected to the power-transmission system of the vehicle and its speed is greater than the normal idling speed, it being understood that the size of the air ports 75, 76 is insufficient to admit such a quantity of air as to destroy the suction effect produced by the engine on the engine side of the valve 11.

Should the speed of the engine fall until it approaches idling speed due to the slowing down of the vehicle or the de-clutching of the engine, the intensity of the engine suction correspondingly decreases until the spring 99 overcomes the suction effect on the diaphragm 96 whereupon said diaphragm is depressed and lowers the valve 80 onto its seating 81 thus shutting-off the chamber 79 from the air passage 83 and opening it to engine suction through the passages 84, 94. The change-over of the valve 80 opens the space in the cylinder 73 above the piston 72 to engine suction through the chamber 79 and passage 78 and allows the spring 74 to raise the piston and shut-off the air ports 75, 76, re-open the supplementary valve 11 and so admit fuel-mixture to the engine through the throttle valve a which is in its idling position.

If, while the supplementary valve 11 is closed, the throttle valve a is opened to enable the engine to develop power, it is necessary at once to cause the re-opening of the valve 11 and the closing of the air ports 75, 76, and it will be seen that the re-opening of the throttle valve disengages the stop 90 from the spindle of the valve 87 and allows the latter to close, thus shutting-off the air supply to the chamber 106 below the diaphragm. The air in the chambers 106 and 85 and the passages 83 and 107 is drawn through the aperture 108 into the passage 94 by the engine suction and the consequent failure of pressure below the diaphragm 96 allows the spring to depress the diaphragm and move over the valve 80 to open the space above the piston 72 to engine suction and allow the spring 74 to raise the piston thus shutting-off the air ports 75, 76 and re-opening the supplementary valve 11.

In operation, when the supplementary valve 11 has closed owing to the abnormal suction in the induction pipe b when the throttle valve a is in idling position and the vehicle is driving the engine at more than idling speed, said suction effect may increase if the air supply to the engine through the ports 75, 76 is less than the supply of fuel-mixture through the throttle valve a in idling position. The uncompensated effect of said increased suction on the diaphragm 96 would prevent the re-opening of the supplementary valve 11 until the engine speed fell below idling speed and would tend to cause the engine to stall, and the passage 109 and set screw 110 are provided to provide the necessary compensation. By adjusting the screw 110, an amount of air is allowed to pass from the groove 77 in the piston 72 through the passage 109 into the passage 94 and so to the interior of the cover 98 which ensures that the spring 99 depresses the diaphragm 96 to cause the valve 80 to move over when the speed of the engine is just greater than its idling speed.

Fig. 10 illustrates an alternative arrangement to that shown in Figs. 7 to 9. In Fig. 10 the supplementary throttle valve 11 and the air inlet valve 87 are dispensed with, and the throttle valve a is completely closed when pressure is withdrawn from the accelerator pedal. The spring-loaded diaphragm 96 and the valve 80 are retained, the passage 83 below the latter and the chamber 106 below the diaphragm being open directly to atmosphere. The spring piston 72, as well as controlling the air ports 75, 76, is provided with a plunger 111 controlling a by-pass 112 leading from the carburettor side of the throttle valve to the engine side thereof. 113 is a fuel supply jet, and 114 is an adjustable screw whereby the opening of the by-pass can be adjusted as required.

It will be seen that while the throttle valve a is open, the piston 72 is raised by its spring and the air ports 75, 76 are closed while the plunger 111 is withdrawn from the by-pass 112 so that fuel-mixture is drawn into the induction pipe b past the throttle valve a and, to some extent, through the by-pass 112. When the throttle valve is closed as shown in Fig. 10, the by-pass allows sufficient mixture to pass to the induction pipe to keep the engine idling, but increased engine suction on the engine side of the valve a when the vehicle drives the engine, is applied through the passage 94 to the interior of the cover 98 above the diaphragm 96 and allows the atmospheric pressure in the chamber 106 to raise the diaphragm and hence the valve 80, thus admitting air above the piston 72 to overcome the resistance of its spring and force down said piston, whereupon air is admitted through the ports 75, 76 to the engine side of the valve a and the plunger 111 closes the by-pass 112. This condition persists until the suction on the engine side of the valve a decreases owing to reduced engine speed or the valve a is reopened by the accelerator pedal. Reduction of suction below the minimum for which the spring 99 is adjusted allows said spring to press down the diaphragm 96 and change-over the valve 80 to shut-off air pressure to the space above the piston 72 and place said space in communication with the engine suction, whereupon the spring 74 raises the piston which shuts the air ports 75, 76 and withdraws its plunger 111 from the by-pass 112 thus restoring a supply of fuel-mixture sufficient to keep the engine idling.

Alternatively, instead of providing a valve such as 80 and a piston such as 72 to close and re-open a supplementary valve such as 11 (Figs. 7 and 8) or a by-pass such as 112 (Fig. 10), I may, as illustrated in Fig. 11, utilize the diaphragm 96 to control a needle valve 113 in the passage 114 of a nozzle-like member 115 screwed into the carburettor body 116 so as to project into the fuel-supply pipe 117 leading from the float chamber 118 to the fuel jet 119, the interior of the cover 98 of said diaphragm being connected by a pipe 120 to the induction pipe b on the engine side of the throttle valve a. In this arrangement, the spring 99 supporting the diaphragm is adjusted so that the increased engine suction due to the engine being driven by the vehicle when the throttle valve is in idling position allows the pressure on the upper side of the diaphragm 96 to overcome the resistance of the spring and close the head 123 of the needle valve 113 over the exit from the passage 114 and so shut-off fuel to the jet 119, the fuel continuing to be shut-off so long as said increased engine suction persists. No additional air inlet need be provided with this arrangement as air alone is drawn into the induction pipe through the throttle valve while the supply of fuel to the jet 119 is shut-off.

A vehicle fitted with any of the above mentioned means for controlling the supply of fuel-mixture to its engine can be allowed to run down an incline under its own momentum with its engine clutch engaged, and, while the engine is connected to the power-transmission system of the vehicle or, where suction-actuated or governor-controlled means are provided, so long as the speed of the engine exceeds its idling speed, no fuel is consumed and the engine draws in air only, the supply of mixture to the engine under the control of the accelerator pedal being automatically restored on actuating said pedal, or a supply of mixture sufficient to prevent stalling of the engine being automatically restored without actuating said pedal when the engine is de-clutched or, in the case of suction-actuated or governor-controlled means, when its speed falls and approximates its idling speed.

What I claim as my invention and desire to secure by Letters Patent is:—

1. Apparatus for controlling the supply of fuel-mixture to the internal-combustion engine of a motor vehicle comprising means for completely shutting-off said supply and simultaneously admitting air in lieu thereof while the engine is connected to the transmission system of the vehicle and is being driven thereby, said means being associated with means for restoring a supply of mixture and simultaneously shutting-off said air which latter means function automatically to prevent the engine stalling when the vehicle ceases to drive the engine.

2. Apparatus according to claim 1, wherein the operation of the mixture shutting-off means and the air admission means and of the restoring means is effected automatically by apparatus controlled by the varying engine suction in the induction pipe.

3. Apparatus according to claim 1, wherein the mixture shutting-off means and the air admission means are operatively associated with the accelerator pedal or equivalent device, and the restoring of the fuel-mixture supply is effected automatically by apparatus controlled by the varying engine suction in the induction pipe.

4. Means as claimed in claim 1 automatically actuated by the engine suction in the induction pipe whereby the fuel-mixture supply to the engine is shut-off and air is admitted to or allowed to enter the induction pipe when the engine suction in said pipe exceeds that produced when the engine is idling on a minimum supply of fuel-mixture, said means automatically operating to exclude said admitted air and to restore said mixture supply when the throttle valve is opened and also when the engine suction in the induction pipe falls until it approximates that produced when the engine is merely idling.

5. Means as claimed in claim 1 comprising a supplementary throttle valve in the induction pipe, the closing of said valve being effected by excess of engine suction over that produced when the engine is idling, and being simultaneous with the opening of an air inlet into said induction pipe on the engine side of said supplementary valve.

6. Means as claimed in claim 1 wherein a supplementary throttle valve in the induction pipe is closed and opened, for the purposes herein described, by a spring-loaded piston to which atmospheric pressure or engine suction is applied under the automatic control of a valve actuated by the intensity of the engine suction in the induction pipe on the engine side of said supplementary valve.

7. Apparatus according to claim 1 comprising a by-pass around the throttle valve in the induction pipe, means controlled by the engine suction on the engine side of the throttle valve for opening and closing a valve in said by-pass and for admitting air to said induction pipe when the engine suction exceeds a predetermined amount.

8. Apparatus according to claim 1 comprising a by-pass around the throttle valve in the induction pipe, means controlled by the engine suction on the engine side of the throttle valve for opening and closing a valve in said by-pass and for admitting air to said induction pipe when the engine suction exceeds a predetermined amount, said means comprising a spring-loaded piston to which atmospheric pressure or engine suction is applied under the automatic control of a valve actuated by the intensity of engine suction in the induction pipe on the engine side of said throttle valve.

ALGERNON SMART.